United States Patent [19]
Brock

[11] 4,071,805
[45] Jan. 31, 1978

[54] INTERIOR LIGHTING DELAY CIRCUIT

[75] Inventor: Eugene W. Brock, Anderson, Ind.

[73] Assignee: General Motors Corporation, Detroit, Mich.

[21] Appl. No.: 723,764

[22] Filed: Sept. 16, 1976

[51] Int. Cl.² .............................................. B60Q 7/00
[52] U.S. Cl. ................................ 315/84; 200/DIG. 4; 315/360
[58] Field of Search .................... 315/84, 80, 86, 360; 307/293, 10 LS, 113, 132 E; 328/128; 200/61.67; 240/7.25, 7.1 A, 7.1 R, 7.35, DIG. 4, 2.13

[56] References Cited
U.S. PATENT DOCUMENTS

| | | | |
|---|---|---|---|
| 2,802,142 | 8/1957 | Johnson | 315/80 |
| 3,916,250 | 10/1975 | Brock et al. | 315/84 |

*Primary Examiner*—Eugene La Roche
*Attorney, Agent, or Firm*—John C. Evans

[57] ABSTRACT

A vehicle lighting system includes a door lock light and switch module removably supported on a door edge and including a light emitting diode to illuminate the door lock and circuit means to energize a courtesy light in the vehicle and wherein associated circuit means including a door operated switch maintain the courtesy light illuminated once the door is unlocked and delay circuit means for maintaining the overhead light energized following door closure with transistorized cutoff means being included to terminate overhead illumination when the ignition switch of the vehicle is turned on.

3 Claims, 4 Drawing Figures

INTERIOR LIGHTING DELAY CIRCUIT

This invention relates to vehicle lighting systems and more particularly to vehicle lighting systems for selectively controlling illumination of overhead and courtesy lamps in response to door switch, time delay electronic means and ignition sequence conditions.

Overhead dome light and courtesy lamps in passenger vehicles are now controlled by multiple switch means including door jamb switches on the vehicle, door lock switches and switches operated in accordance with positioning of a transmission control lever.

An example of a time delay door lock lighting control system is set forth in U.S. Pat. No. 3,916,250, issued Oct. 23, 1975, to Brock et al. In this arrangement the courtesy lamp of a vehicle is maintained energized in response to operation of door opening mechanism of the vehicle. Another proposal for time delay control of courtesy lamps in the vehicle is set forth in U.S. Pat. No. 2,802,142, issued Aug. 6, 1957. In this system a time delay interrupt switch is provided to maintain a time delayed energization of an interior lamp of a vehicle. The control circuit includes a transmission lever operated switch that will interrupt the time delay period if the operator of the vehicle so desires.

In U.S. Pat. No. 3,221,211, issued Nov. 30, 1965, to Murphy et al, an interior vehicle lamp is maintained energized for a predetermined time period by use of a monostable multivibrator which is driven to an unstable state by means of a door switch on the vehicle and then the multivibrator is operated at a high power level output to energize the lamp and wherein the multivibrator includes an RC circuit to produce a timed maintenance of the high output state after which the lamp is deenergized.

The present invention affords means to assure energization of an overhead dome light or courtesy lamp within the passenger compartment of a vehicle to assure that the lamp is turned on before the vehicle door is opened and thereafter to maintain the lamp energized for a time delay period after the door is closed while including means for extinguishing the overhead lamp as soon as the ignition switch is closed thereby to maintain the interior of the passenger vehicle lighted during periods where illumination is desired and to extinguish the lamp during times when illumination is undesirable.

Accordingly, an object of the present invention is to provide an improved interior lighting control system for a passenger vehicle wherein means are provided to energize an interior lamp of a vehicle for illumination prior to the time that the vehicle door is opened; including means for producing a timed energization of the vehicle lamp wherein the door jamb switch is a triggering device for the time delay in response to the door being opened and closed; and by the further provision of electronic control means for terminating the time delay period of courtesy lamp or dome lamp energization at any time during the time interval by turning on the ignition switch of the vehicle.

Still another object of the present invention is to provide an improved vehicle interior lighting control system wherein a door lock module is provided including light emitting diode means for illuminating a door lock and switch means for independently energizing an interior lamp of the vehicle prior to door opening and closing and wherein a door jamb switch is provided and responsive to the vehicle door being open and closed to trigger first electronic control means to produce a predetermined time delay energization of the interior lamp after the door is closed; the circuit further including time delay termination means including a transistor operative at any time during the delay interval by turning on the ignition switch thereby to condition the first electronic control means to deenergize the interior lamp.

Still another object of the present invention is to provide an improved control system for selectively energizing the interior lighting of a passenger vehicle including a door lock light and switch module having a clip-on housing connected to the door edge of a vehicle and including a light emitting diode for illuminating an adjacent door lock on the door vehicle; the light emitting diode being energized by means including a momentary switch within the module and wherein operation of the momentary switch completes a first energization circuit for the interior lamp of the vehicle and wherein second energization circuit means for the interior light include a door jamb switch and associated third circuit means including time delay means triggered in response to the door being opened and closed and the door switch being sequenced through two operating states; and wherein the third circuit means are controlled by a transistorized circuit operative in response to a vehicle ignition switch to condition the third energization circuit means to extinguish the interior light when the ignition switch is turned on for operating the vehicle.

Further objects and advantages of the present invention will be apparent from the following description, reference being had to the accompanying drawings wherein a preferred embodiment of the present invention is clearly shown.

Figure 1:
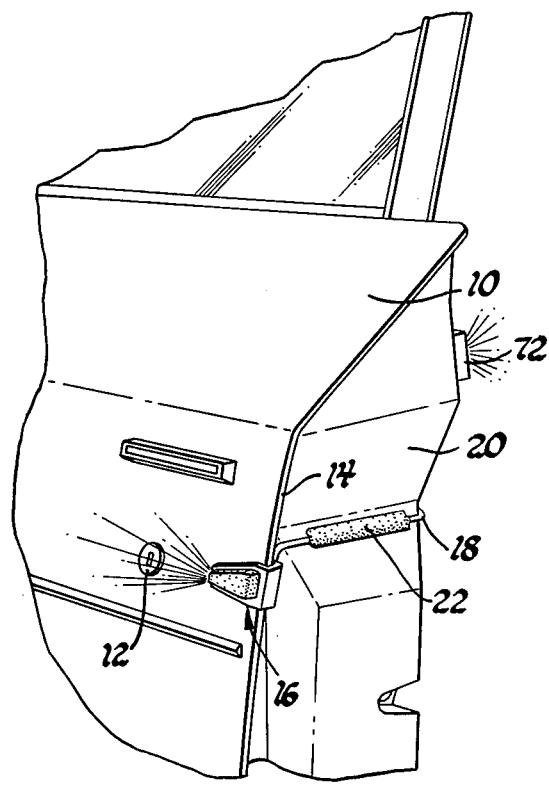
FIG. 1 is a fragmentary elevational view of a vehicle door having the door lock light and switch module of the present invention located thereon.

Referring now to FIG. 1, a vehicle door 10 is illustrated including a door lock 12 thereon located adjacent a door edge 14 extending along one end of the door 10. A door lock light and switch module 16 is supported on the door edge 14 and includes a wiring harness 18 therefrom extending across an end panel 20 on the door and being secured there to provide suitable fastening means such as adhesive strip 22.

Figure 2:
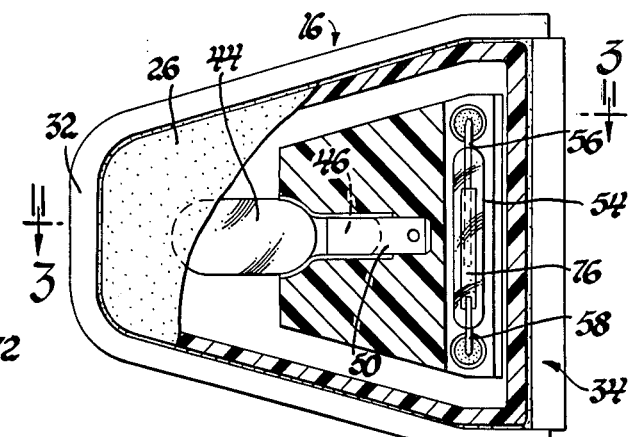
FIG. 2 is a front elevational view, partially broken away and sectioned of the module of the present invention.
Figure 3:
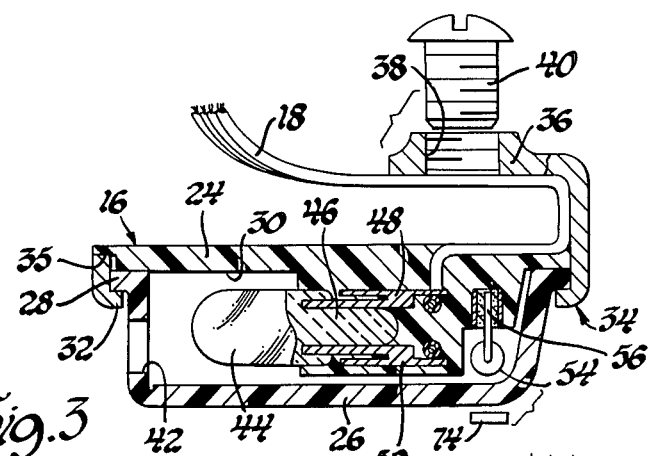
FIG. 3 is a horizontal sectional view taken along the line 3—3 of FIG. 2 looking in the direction of the arrows.

Referring now more particularly to FIGS. 2 and 3, the door lock light and switch module 16 includes a housing base 24 with an open-ended cover 26 thereon with a peripheral flange 28 in engagement with the inner surface 30 of the base 24.

The flange 28 fits against an inwardly turned flange 32 on a frame 34 to which a peripheral edge 35 of the base 24 is secured by a suitable fastening means. Frame 34 includes a rebent bracket 36 with a threaded hole 38 which threadably receives a set screw 40 that clamps against the inner surface of the door edge 14 to clamp the module 16 securely in place adjacent the door lock 12 as shown in FIG. 1.

Figure 4:
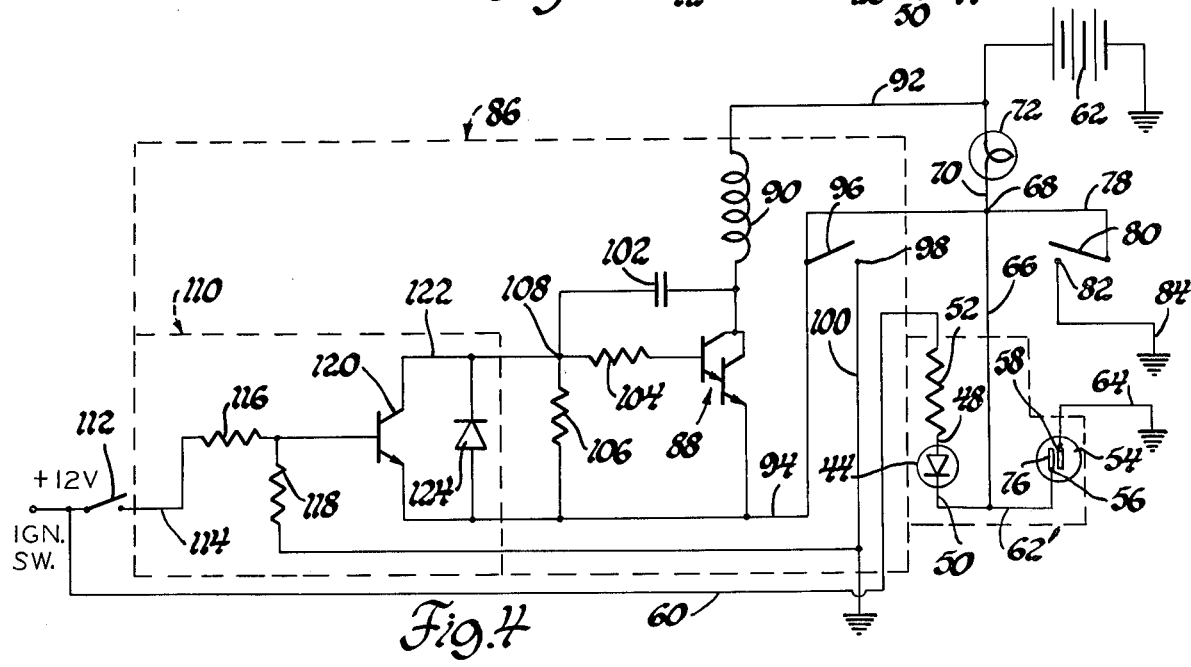
FIG. 4 is a schematic electrical diagram of a control circuit in accordance with the present invention.

The housing 26 includes an opening 42 in alignment with the lock 12. A light emitting diode 44 has a base 46 thereon with spaced terminals 48, 50. The terminals 48, 50 are connected with respect to a resistor 52 and a selectively operable momentary magnetically responsive leaf switch 54 having spaced terminals 56, 58. As shown in FIG. 4, the module 16 is connected by an electrical lead 60 in harness 18 to a positive terminal of a battery D.C. power source 62 and the resistor 52. Resistor 52 is connected in turn to the terminal 48 of the light emitting diode 44. The cathode of the diode 44 is connected through a conductor 62' to the input terminal 56 of the leaf switch 54 which has its terminal 58 connected by a conductor 64 in harness 18 to ground. Switch 54 can also be in the form of a manually operated pressure responsive two terminal switch or any other switch which is momentarily on-off.

Additionally, the harness 18 includes a conductor 66 connected to a junction 68 connected by a conductor 70 to one side of a courtesy light 72 having the opposite side thereof connected to the positive voltage source represented by the battery 62.

When the switch 54 is closed, as for example, when a permanent magnet 74 is moved with respect thereto to move a movable reed 76 of the switch 54 into engagement with the terminal 56 a first energization circuit for the lamp 72 is completed from the battery 62 thence through the conductors 70, 66, 62', through the closed switch 54 thence through conductor 64 to ground.

A second energization circuit for lamp 72 is defined by a conductor 78 from junction 68 thence through a movable contact 80 of a door switch having a fixed contact 82 thereof connected by a conductor 84 to ground. Operation of the movable contact 80 of the door switch will also energize the lamp 72 independently of the operation of the door lock light switch module 16.

The circuit further includes a time delay electronic control circuit 86. It includes a first transistor 88 in the form of a Darlington pair having its collector junctions connected to coil 90 and a conductor 92 to the battery source 62.

The emitter circuit of the Darlington pair 88 are connected through a conductor 94 to the junction 68. The coil 90, when energized, controls a movable contact 96 of a relay switch to position it closed against the fixed contact 98 thereof to complete a hold circuit through conductor 100 to ground.

A time delay for lamp energization includes a capacitor 102 connected from the collector circuits of transistor 88 to the base thereof in parallel with a resistor 104 and to resistor 106 to conductor 94. The time constant of a capacitor 102 and resistor 106 determines the time delay for maintenances of energization of the light 72 as will be described. Resistor 106 is connected from junction 108 between the capacitor 102 and resistor 104 to the emitter circuits of the transistor 88.

By virtue of the aforesaid arrangement, when either the movable reed 76 of the magnetic responsive reed switch is closed as for example when a magnet is passed into the vicinity of the module 16 and/or the door switch 80 is opened or closed the transistor 88 is conditioned to be conductive from the collector to emitter circuits thereof thereby to energize coil 90 to close the movable contact 96 of the relay switch against its fixed contact 98 so as to maintain a time controlled energization of the light 72 from the battery 62 thence through the junction 68, the closed circuit at contacts 96, 98 and conductor 100 to ground. The RC constant of capacitor 102 and resistor 106 will eventually produce a base signal on transistor 88 causing it to be nonconductive. At this point the coil 90 is deenergized and the switch contact 96 will open to extinguish the light 72.

The time delay is selected to permit inspection of the interior of a car following closure of the magnetic switch 54; to unlock the car and to arrange packages and the like and otherwise meet customer conveniences.

Another feature of the present invention is provided by an ignition switch override of the time delay circuit 86. The time delay period established by the time constant of the capacitor 102 and resistor 104, in some cases, exceeds the time period required to start the vehicle and move it. Accordingly, the time delay circuit 86 is associated with a time interrupt circuit 110 which includes a circuit from the battery 62 through an ignition switch 112 thence through a conductor 114 to a pair of voltage divider resistors 116, 118 to the base of a transistor 120 having its collector circuit connected by a conductor 122 to the junction 108 and having its emitter circuit connected to the conductor 94.

A diode 124 is connected across the emitter collector circuits of the transistor.

The operation of the circuit is as follows. Assuming the device to be in the off-state, the capacitor 102 is at zero charge because of the presence of a 12-volt source at the relay coil 90 and at the courtesy lamp 72 when they are in an off condition. Because of this, the transistor 88 cannot be turned on as long as its emitter has +12 volts maintained thereon.

When the door jamb switch 80 is closed, the emitter circuit of the transistor 88 is grounded to turn the transistor 88 on thereby to energize the relay coil 90 and operate the relay switch to close the movable contact 96 thereof thus to complete one energization circuit for the light 72. The light 72 remains on after the door is closed due to the forward bias maintained on the transistor 88 by the time constant of the RC circuit represented by the capacitor 102 and resistor 106. Eventually, the capacitor 102 discharges through the grounded resistor 106 and the potential at the base of the transistor 88 is lowered until it turns off, thus deenergizing the relay coil 90 to open the movable switch 96 of the relay switch to deenergize the light 72.

The time interrupt transistor 120 inhibits operation if the ignition switch 112 is turned into an on position. When battery voltage is applied to the base of transistor 120 it is conditioned to conduct and the resistor 106 is shunted. This causes the transistor 88 to be biased into a nonconductive state thereby terminating the time delay sequence at any point in its operation after the ignition switch is turned "on".

The door lock light switch module circuitry as a separate package is easily connected as an add-on unit to a door edge of a vehicle door and the feature of a lighted door lock is obtained as well as that of an additional control for the courtesy lamp 72.

In one working embodiment circuit components have the following ratings.

| Component | Rating |
| --- | --- |
| Resistor 104 | 33 Kohms |
| Resistor 106 | 270 Kohms |
| Resistor 116 | 1 Kohms |
| Resistor 118 | 220 ohms |
| Capacitor 102 | 15 MMF Tantalum |
| Coil 90 | 200 ohm (No relay, 8A contacts) |
| Transistor 88 | MPSA12 or 2N5307 |
| Transistor 120 | 5958866 |

The module 16 is characterized by three components including a yellow light emitting diode 44; a resistor 52 connected to the 12 volt battery source and a momentary make and break switch represented by the magnetic reed switch 54. All of these components are present in the module 16 which is in the form of an easily clamped on package connectible to the rear edge of a car door. Momentary operation of the reed switch 54 starts the delay circuit 86 in the same manner as operation of the door jamb switch 80 initiates the time delay energization of the light 72. The light emitting diode circuit for illuminating the lock 12 is closed through the relay contacts 96, 98 along with the courtesy lamp 72 so that the lock 12 will be illuminated by the light emitting diode 44 concurrently with illumination of the passenger compartment by the courtesy lamp 72.

While the embodiment of the present invention, as herein disclosed, constitutes a preferred form, it is to be understood that other forms might be adopted.

The embodiments of the invention in which an exclusive property or privilege is claimed are defined as follows:

1. In a vehicle lamp control system for selectively energizing a vehicle interior lamp from a vehicle battery in response to operation of a door jamb switch selectively opened and closed in response to the door being positioned closed and open, respectively, the combination of: first circuit means including the door jamb switch for energizing the interior lamp when the door is opened, second circuit means including a relay switch for energizing the lamp independently of said door jamb switch, a relay switch control circuit for operating said relay switch closed when said door is momentarily opened for maintaining the interior lamp energized when the door is closed, timer circuit means including said relay switch for terminating energization of said lamp a predetermined delayed period after door closure, said relay switch control circuit including a coil and a series connected first transistor having its emitter and base connected to the vehicle battery source only when the vehicle door is closed to maintain the transistor nonconductive and being responsive to the door being opened to ground said emitter to cause the first transistor to be conductive from the collector to emitter terminals thereof, said timer circuit means being responsive to conduction of said first transistor and closure of said relay switch to remove battery potential from the base of said first transistor at a rate to maintain the relay switch conditioned for the predetermined delay period for maintenance of interior light energization following door closure, a vehicle ignition switch, means including a second transistor responsive to operation of the ignition switch to remove base potential from the first transistor when the ignition switch is turned on to immediately turn off the interior light before the vehicle is started and shifted to a drive mode.

2. A vehicle lamp control system for selectively energizing a vehicle interior lamp from a vehicle battery the combination of circuit means including a relay switch for energizing the lamp, a relay switch control circuit for operating said relay switch closed for maintaining the interior lamp energized when the door is closed, timer circuit means for terminating energization of said lamp after a predetermined delay period, a door light switch module including a housing, means on said housing for clamping said housing on a door edge adjacent a vehicle door lock, a light emitting diode in said housing energizable to illuminate the lock, momentary switch means in said housing operable to simultaneously energize the diode and said interior lamp and to initiate the time delay energization of said lamp, said relay switch control circuit including a first transistor having its emitter connected to a vehicle battery source and means operative to reduce voltage at said emitter when the momentary switch is triggered to condition said first transistor to be conductive from the collector to emitter terminals thereof, said timer circuit means being responsive to conduction of said first transistor and closure of said relay switch to remove base potential from said first transistor at a rate to maintain the relay switch conditioned for the predetermined delay period for maintenance of interior light energization following triggering by said momentary switch means, a vehicle ignition switch, means including a second transistor responsive to operation of the ignition switch to remove base potential from the first transistor when the ignition switch is turned on to immediately turn off the interior light before the vehicle is started and shifted to a drive mode and to thereby immediately extinguish the light at any time in the time delayed period.

3. A vehicle lamp control system for selectively energizing a vehicle interior lamp from a vehicle battery in response to operation of a door jamb switch selectively opened and closed in response to the door being positioned closed and open, respectively, the combination of: first circuit means for energizing the interior lamp when the door is opened, second circuit means including a relay switch for energizing the lamp independently of said door jamb switch, a relay switch control circuit for operating said relay switch closed when said door is momentarily opened for maintaining the interior lamp energized when the door is closed, timer circuit means for terminating energization of said lamp a predetermined delayed period after door closure, said relay switch control circuit including a first transistor having its emitter connected to the vehicle battery source when the vehicle door is closed to maintain the transistor nonconductive and being responsive to the door being opened to condition said timer circuit means to cause the first transistor to be conductive from the collector to emitter terminals thereof, said timer circuit means being responsive to conduction of said first transistor to remove base potential from said first transistor at a rate to maintain the relay switch conditioned for the predetermined delay period for maintenance of interior light energization following door closure, a vehicle ignition switch, means including a second transistor responsive to operation of the ignition switch to remove base potential from the first transistor when the ignition switch is on and the door is closed to turn off the interior light before the vehicle is started and shifted to a drive mode, a door light switch module including a housing, means on said housing for clamping said housing on a door edge adjacent a vehicle door lock, a light emitting diode in said housing energizable to illuminate the lock, momentary switch means in said housing operable to simultaneously energize the diode and said interior lamp and to initiate the time delay energization of said lamp.

* * * * *